(12) United States Patent
Hyun et al.

(10) Patent No.: US 11,325,490 B2
(45) Date of Patent: May 10, 2022

(54) MOVABLE STATION FOR ELECTRIC KICK SCOOTER

(71) Applicant: EV PASS Co., LTD, Jeju-si (KR)

(72) Inventors: Seung Bo Hyun, Jeju-si (KR); Hae Yong Yang, Suwon-si (KR); Yeon Tae Kim, Yongin-si (KR); Hyung Moon Lee, Jeju-si (KR); Hye Jin Song, Yongin-si (KR)

(73) Assignee: EV PASS CO., LTD, Jeju-si (KR)

( * ) Notice: Subject to any disclaimer, the term of this patent is extended or adjusted under 35 U.S.C. 154(b) by 225 days.

(21) Appl. No.: 16/619,051

(22) PCT Filed: Jul. 25, 2019

(86) PCT No.: PCT/KR2019/009247
§ 371 (c)(1),
(2) Date: Dec. 3, 2019

(87) PCT Pub. No.: WO2020/262756
PCT Pub. Date: Dec. 30, 2020

(65) Prior Publication Data
US 2021/0331595 A1 Oct. 28, 2021

(30) Foreign Application Priority Data
Jun. 27, 2019 (KR) ........................ 10-2019-0077207

(51) Int. Cl.
| *H02J 7/00* | (2006.01) |
| *H02J 7/14* | (2006.01) |
| *B60L 53/30* | (2019.01) |
| *B60L 53/20* | (2019.01) |
| *B60L 53/16* | (2019.01) |
| *B60L 53/18* | (2019.01) |
| *B60P 3/073* | (2006.01) |

(52) U.S. Cl.
CPC ............... *B60L 53/30* (2019.02); *B60L 53/16* (2019.02); *B60L 53/18* (2019.02); *B60L 53/20* (2019.02); *B60P 3/073* (2013.01)

(58) Field of Classification Search
USPC ........................................................ 320/134
See application file for complete search history.

(56) References Cited

U.S. PATENT DOCUMENTS

| 9,187,004 B1* | 11/2015 | Davis ..................... B60L 53/30 |
| 9,263,898 B1* | 2/2016 | Ghazarian ............ H02J 7/0021 |
| 9,276,418 B2* | 3/2016 | Kawasaki ............. H02J 7/0013 |
| 2007/0040087 A1* | 2/2007 | Barron ..................... B62H 3/12 |
| | | 248/309.1 |

(Continued)

FOREIGN PATENT DOCUMENTS

KR         10-1980155 B1      5/2019

*Primary Examiner* — Alexis B Pacheco
(74) *Attorney, Agent, or Firm* — Goldilocks Zone IP Law (57) ABSTRACT

The present invention relates to a movable station. More particularly, the present invention relates to a movable station including a vehicle, a multi-tier open frame rack installed in the vehicle, and multiple accommodation modules mounted on each tier of the rack and each of which stably secures an electric kick scooter. With the use of the movable station, many electric kick scooters can be picked up easily and stably carried. In addition, damage to the electric kick scooters and stable placement frames can be prevented during transportation of the electric kick scooters.

10 Claims, 7 Drawing Sheets

(56) References Cited

U.S. PATENT DOCUMENTS

| | | | |
|---|---|---|---|
| 2009/0198372 A1* | 8/2009 | Hammerslag | H02J 7/0027 |
| | | | 700/226 |
| 2016/0368464 A1* | 12/2016 | Hassounah | B60L 53/80 |
| 2018/0104829 A1* | 4/2018 | Altman | B25J 9/162 |
| 2019/0035282 A1* | 1/2019 | Ferguson | B65G 67/24 |
| 2019/0135158 A1* | 5/2019 | Outoukian | B60L 53/14 |
| 2019/0299803 A1* | 10/2019 | Cheng | H01M 10/425 |
| 2020/0406780 A1* | 12/2020 | Hassounah | B60L 53/305 |
| 2021/0178930 A1* | 6/2021 | da Nobrega de Sousa da Camara | G07C 5/085 |
| 2021/0240202 A1* | 8/2021 | Yesh | B66F 9/12 |

\* cited by examiner

MOVABLE STATION FOR ELECTRIC KICK SCOOTER

CROSS-REFERENCE TO RELATED APPLICATIONS

This application claims the benefit under 35 U.S.C. section 371, of PCT International Application No.: PCT/KR2019/009247, filed on Jul. 25, 2019, which claims foreign priority to Korean Patent Application No.: KR10-2019-0077207, filed on Jun. 27, 2019, in the Korean Intellectual Property Office, both of which are hereby incorporated by reference in their entireties.

TECHNICAL FIELD

The present invention relates to a movable station. More particularly, the present invention relates to a movable station for electric kick scooters, the movable station including a vehicle, a multi-tier open frame rack installed in the vehicle, and multiple accommodation modules mounted on each tier of the rack to stably secure electric kick scooters accommodated therein, the moving station being advantageous in that many electric kick scooters can be easily and stably picked up and carried and damage to the electric kick scooters and stable placement frames of the rack can be prevented.

BACKGROUND ART

An electric kick scooter that is driven automatically using an electric motor has been widely used as a means for leisure activity or a means for transportation.

Particularly, in recent years, electric kick scooter sharing systems, as disclosed in Patent Document, have rapidly gained popularity.

In the electric kick scooter sharing system, a user is authenticated through a QR code or the like, a payment for use of an electric kick scooter for a fixed time is made through a smartphone or the like, and the electric kick scooter is rented and returned anywhere regardless of location.

However, in this case, because the electric kick scooter is returned in any place, electric kick scooters are difficult to manage, and the electric kick scooters are concentrated in a specific position. This makes difficult for other users to use the electric kick scooters.

In addition, the electric kick scooter is a transportation means of providing fun and convenience when looking around a specific location in a tourist attraction site or the like. The electric kick scooters, if transported and rented at the tourist attraction, are expected to increase in popularity.

Therefore, in this situation, it is necessary to develop an apparatus that is capable of easily picking up and transporting the electric kick scooters.

DOCUMENTS OF RELATED ART

Patent Document

Korean Patent No. 10-1980155 (registered on May 14, 2019) titled "ELECTRIC KICK SCOOTER RENTING SHARING SYSTEM"

DISCLOSURE

Technical Problem

The present invention has been made in view of the problems described above.

An objective of the present invention is to provide a movable station for an electric kick scooter, which is capable of easily and stably picking up and transporting many electric kick scooters.

Another objective of the present invention is to provide a movable station for an electric kick scooter, which is capable of also stably securing electric kick scooters while a vehicle moves.

Still another objective of the present invention is to provide a movable station for an electric kick scooter, which is capable of preventing an electric kick scooter and a stable placement frame from being damaged and of stably supporting the electric kick scooter.

Still another objective of the present invention is to provide a movable station for an electrically-powered kickboard, which is capable of reducing a space for installing an accommodation module and thus of accommodating and transporting many electric kick scooters simultaneously.

Still another objective of the present invention is to provide a movable station for an electric kick scooter, which is capable of efficiently using a space and of conveniently using a footrest pushing-down member.

Still another objective of the present invention is to provide a movable station for an electric kick scooter, which is capable of charging an electric kick scooter accommodated in an accommodation module while a vehicle moves.

Still another objective of the present invention is to provide a movable station for an electric kick scooter, which is capable of accommodating and charging electric kick scooters having various specifications.

Technical Solution

In order to accomplish the objectives described above, the present invention is embodied in configurations described below.

According to an embodiment of the present invention, there is provided a movable station including: a vehicle that moves in a state where an accommodation module is accommodated inside the vehicle; a rack frame that is formed, within the vehicle, to have frames, and secures multiple accommodation modules; and the multiple accommodation modules, each of which accommodates and secures the electric kick scooter and which are formed to be mounted on the rack frame.

According to another embodiment of the present invention, in the movable station, the rack frame may include multiple vertical frames that are installed in the vertical direction to be secured to the floor and the ceiling within the vehicle, and a horizontal frame that connects orthogonally between the vertical frames, on which the multiple accommodation modules are placed stably and thus are secured.

According to another embodiment of the present invention, in the movable station, the accommodation module may include a stable replacement frame into which the electric kick scooter is inserted to be stably placed, and a footrest securing unit that pushes down a footrest of the electric kick scooter inserted into the stable replacement frame and thus secures the footrest.

According to another embodiment of the present invention, in the movable station, the stable replacement frame may include a bottom portion that forms the bottom thereof, flank-surface support portions that protrude vertically upward from both sides, respectively, of the bottom portion, and thus support flank surfaces, respectively, of the electric kick scooter, a front blocking portion that protrudes vertically upward from the front end portion of the bottom portion and thus supports the front side of the electric kick scooter, and a support portion made of an elastic material, which is formed on the inside surfaces of the bottom portion, the flank-surface support portion, and the front blocking portion.

According to another embodiment of the present invention, in the movable station, the footrest securing portion may include a footrest pushing-down member that is secured on the flank-surface support portions on both sides and pushes down the footrest of the electric kick scooter and a pushing-down member coupling assembly that removably secures the footrest pushing-down member to the flank-surface support portion.

According to another embodiment of the present invention, in the movable station, the footrest pushing-down member may include: a grooved end portion that is formed as a result of cutting a groove downward in one end portion thereof, stationary levers in one pair that are formed on the front and rear sides, respectively, of the other end portion thereof to be coupled to the pushing-down member coupling assembly, and a pressing elastic member made of an elastic material, which is formed on the lower surface of the footrest pushing-down member; and the pushing-down member coupling assembly may include a hooking member that is formed to protrude upward from the flank-surface support portion on one side, and into which the grooved end portion is inserted through a through-hole in order to be supported, and a protrusion end portion that is formed to protrude outward from the flank-surface support portion on the other side, and from the front and rear sides of which a securing ring protrudes in order for the stationary lever to be coupled to the securing ring.

According to another embodiment of the present invention, in the movable station, the stationary lever may include a hook that is hooked on the stationary ring and thus is pulled, the stationary ring may include an insertion groove that results from cutting a groove upward in the lower end portion thereof, and into which the hook is inserted, and, by pulling the stationary lever, the hook may be hooked onto the insertion groove and thus be secured.

According to another embodiment of the present invention, in the movable station, the footrest securing unit may include a pushing-down member cradling assembly that cradles the footrest pushing-down member when the electric kick scooter is not accommodated, the pushing-down member cradling assembly may be formed to protrude outward from the flank-surface support portion and may include an insertion hole that passes vertically through the pushing-down member cradling assembly, and the stationary lever of the footrest pushing-down member that is inserted into the insertion hole may be hooked and thus be secured.

According to another embodiment of the present invention, in the movable station, the accommodation module may include an additional-securing portion that, with a securing wire, additionally secures the electric kick scooter accommodated in the stable placement frame, and the additional-securing portion may include a protrusion member that is formed to protrude outward from the flank-surface support portions on one side and on the other side, is hooked onto the securing wire, and thus is secured.

According to another embodiment of the present invention, in the movable station, the securing wire may be formed of an elastic material, a hooking ring in the form of a circle may be formed on an end portion thereof, the protrusion member may include a hooking end portion that protrudes outward along an edge of an end portion thereof, and the hooking ring may be hooked onto the protrusion member and thus be secured.

According to another embodiment of the present invention, in the movable station, the accommodation module may include a charging unit that charges the electric kick scooter mounted in the accommodation module.

According to another embodiment of the present invention, in the movable station, the charging unit may include a charging electrical outlet to which electric power that is supplied to the charging unit by inserting a plug is transferred, an electric power conversion module that is connected to an electrical outlet bracket that is secured on the rack frame and thus supports the charging electrical outlet and to the charging electrical outlet, is supplied with the electrical power, converts the supplied electric power into a voltage that is suitable for the electric kick scooter, and supplies the resulting voltage to the electric kick scooter, and a module bracket that is formed to have a fixed space and accommodates the electric power conversion module in the fixed space.

According to another embodiment of the present invention, in the movable station, the rack frame may be formed to take the form of a pipe rectangle in cross section, which has an empty space inside, and an electric power line over which electric power is supplied to the charging unit may pass through the empty space inside the rack frame.

Advantageous Effects

According to the present invention, the following advantages are obtained with the embodiments described above, and configurations, combinations, and relationships in use that will be described below.

According to the present invention, a rack frame is formed, within a vehicle, to have frames, and multiple accommodation modules, each of which secures an electric kick scooter. This provides an advantage of picking up easily and stably and transporting many electric kick scooters.

According to the present invention, the electric kick scooter is supported from the flank surface and the front side of a stable placement frame, and, through a footrest securing unit, a footrest of the electrically-controlled kickboard is pushed down, thereby being secured. This provides an advantage of also stably securing the electric kick scooter while a vehicle moves.

According to the present invention, an elastic support portion made of an elastic material is formed on the bottom, the flank surface, the front side of the stable placement frame. This provides an advantage of preventing the electric kick scooter and the stable placement frame from being damaged and of stably supporting the electric kick scooter.

According to the present invention, the footrest securing unit is removably formed, and only when the electric kick scooter is accommodated, is pulled out of a space. This provides an advantage of accommodating and transporting many electric kick scooters simultaneously.

According to the present invention, a footrest pushing-down member is cradled between accommodation modules. This provides an advantage of efficiently using a space and conveniently using the footrest pushing-down member.

According to the present invention, a charging unit is formed. This provides an advantage of charging the electric kick scooter accommodated in the accommodation module while the vehicle moves.

According to the present invention, electric power is converted in a manner that is suitable for a proper voltage of the electric kick scooter and the resulting voltage is supplied. This provides an advantage of accommodating and charging electric kick scooters having various specifications.

DESCRIPTION OF THE REFERENCE NUMERALS IN THE DRAWINGS

1: VEHICLE
2: RACK FRAME 21: VERTICAL FRAME 22: HORIZONTAL FRAME
3: ACCESSORY PART CONTAINER
4: ACCOMMODATION MODULE 41: STABLE PLACEMENT FRAME 411: BOTTOM PORTION
412: FLANK-SURFACE SUPPORT PORTION 413: FRONT BLOCKING PORTION 414: ELASTIC SUPPORT PORTION
414*a*: BOTTOM PROTECTION MEMBER 414*b*: FLANK-SURFACE PROTECTION MEMBER 414*c*: FRONT PROTECTION MEMBER
42: FOOTREST SECURING UNIT 421: FOOTREST PUSHING-DOWN MEMBER 421*a*: GROOVED END PORTION
421*b*: STATIONARY LEVER 421*b*-1: HOOK 421*c*: PRESSING ELASTIC MEMBER
422: PUSHING-DOWN MEMBER COUPLING ASSEMBLY 422*a*: HOOKING MEMBER 422*a*-1: THROUGH-HOLE
422*b*: PROTRUSION END PORTION 422*b*-1: SECURING RING 422*b*-11: INSERTION GROOVE
423: PUSHING-DOWN MEMBER CRADLING ASSEMBLY 423*a*: INSERTION HOLE 43: ADDITIONAL-SECURING UNIT
431: PROTRUSION MEMBER 431*a*: HOOKING END PORTION 432: SECURING WIRE
432*a*: HOOKING RING 44: CHARGING UNIT 441: CHARGING ELECTRICAL OUTLET
442: ELECTRICAL OUTLET BRACKET 443: ELECTRIC POWER CONVERSION MODULE 444: MODULE BRACKET
444*a*: OPEN HOLE

BEST MODE

Movable stations according to preferred embodiments of the present invention will be described in detail with reference to the accompanying drawings. In a case where it is determined that, in the following description of the present invention, a detailed description of a function or a configuration known in the related art will prevent the nature and gist of the present invention from being made apparent, the detailed description thereof is omitted. Unless explicitly described otherwise, the expression "an apparatus (device or a method) includes a constituent element" throughout the specification is intended to mean "an apparatus (device or a method) may further include any other constituent element, not to mean that an apparatus (a device or a method) excludes any other constituent element. In addition, the terms "unit", "module", and the like, which are described through the specification, mean an individual component that performs at least one function or operation and may be realized in hardware, in software, or both in hardware and in software.

A movable station for an electric kick scooter according to an embodiment of the present invention is described with reference to FIGS. 1 to 7. The movable station includes a vehicle 1 that moves in a state where an electric kick scooter 100 is accommodated inside the vehicle 1, a rack frame 2 that is formed within the vehicle to have frames and secures multiple accommodation modules 4, an accessory part container 23 that contains an accessory part necessary for use of the electric kick scooter, and the multiple accommodation modules 4, each of which accommodates and secures the electric kick scooter 100 and which are mounted on the rack frame 2.

In an electric kick scooter sharing system, as described in Background Art, the movable station according to the present invention stably accommodates many electric kick scooters 100 in the vehicle 1 for transportation and to charge the electric kick scooter 100 while in transportation, in order to efficiently pick up and transport the electric kick scooters. To this end, in the movable station, the accommodation module 4 that accommodates the electric kick scooter 100 is mounted, in the form of a module, on the rack frame 2, and a charging electrical outlet 441 is formed in each accommodation module 4 to charge the accommodated electric kick scooter 100.

The vehicle 1 is configured to move in the state where the electric kick scooter 100 is accommodated inside the vehicle 1. A truck or the like that has a space inside may be used as the vehicle 1. The rack frame 2 is mounted within the vehicle 1, and thus many accommodation modules 4 are secured.

Figure 1:
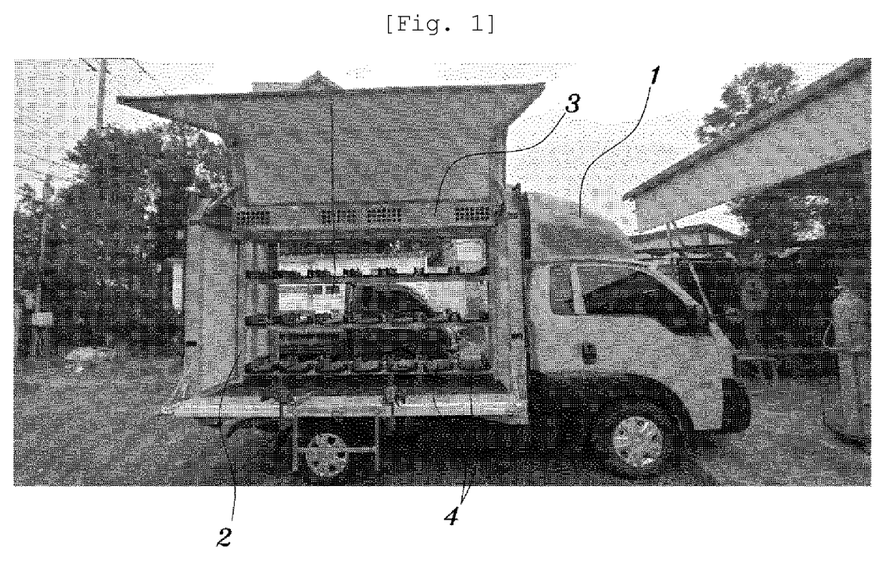
FIG. 1 is a photograph showing a movable station for an electric kick scooter according to an embodiment of the present invention.
Figure 2:
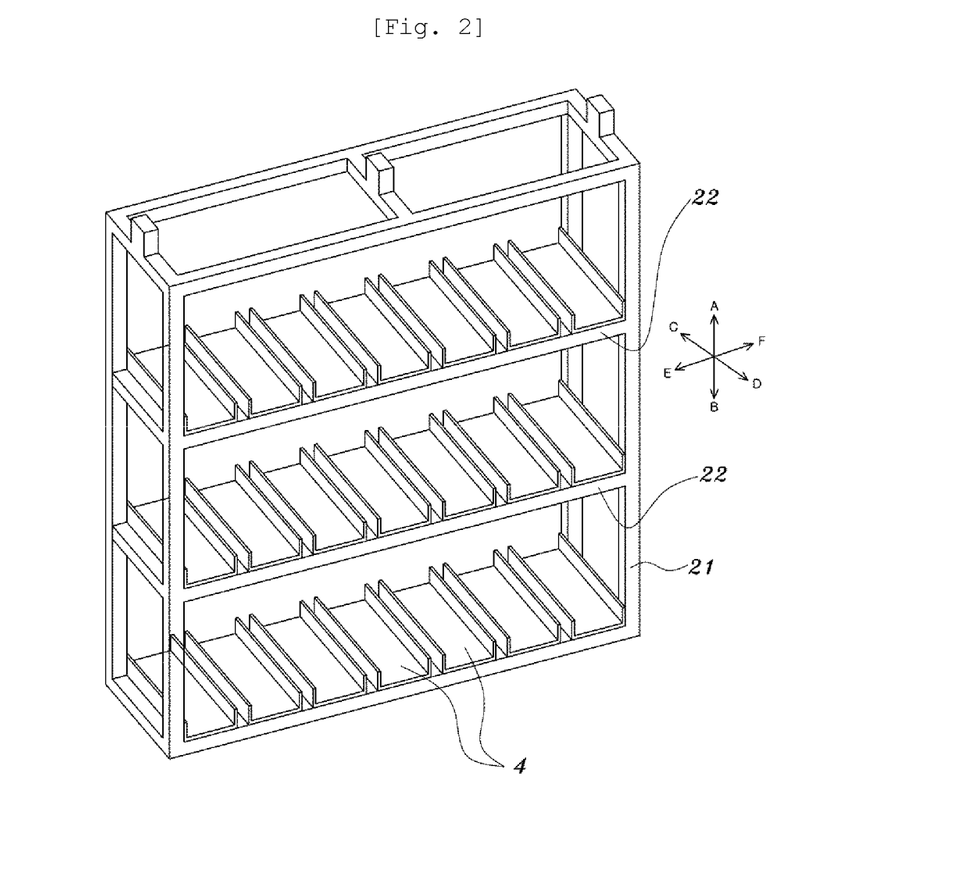
FIG. 2 is a perspective diagram illustrating an example where a rack frame in FIG. 1 is installed.

The rack frame 2 is configured to be mounted into the vehicle 1 and thus to secure the accommodation module 4, and includes a vertical frame 22 in the vertical direction and a horizontal frame 21 that is horizontal to the floor of the vehicle 1. Multiple vertical frames 22 are formed at a fixed distance from each other and are secured to the floor of and the ceiling of the vehicle 1. The horizontal frame 21 is formed to connect orthogonally between the vertical frames 22. Therefore, the horizontal frame 21 is horizontal to the bottom of the vehicle 1, and thus the accommodation module 4 is placed stably on the horizontal frame 21. Multiple accommodation modules 4 are placed stably at a fixed distance from each other along the horizontal frame 21. It is preferable that horizontal frames 21 are formed in backward and forward directions and thus support the accommodation modules 4 in the backward and forward directions, respectively. As illustrated in FIG. 2, for reference, A, B, C, D, E, and F directions are assumed to be upward, downward, forward, backward, leftward, and rightward directions, respectively. In addition, the rack frame 2 is formed to take the form of a pipe that has an empty space inside, and thus an electric power line over that electric power is supplied to a charging unit 44, and the like pass through the empty space. It is preferable that, for possible stable support of the accommodation module 4, the rack frame 2 is formed to take the form of a pipe rectangular in cross section.

The accessory part container 23 is configured to contain accessory parts, such as a helmet, a protection pad, a repair tool, that are necessary for the use of the electric kick scooter 100, and may be configured to be formed in a separate space in the ceiling of the vehicle 1.

The accommodation module 4 is configured in such a manner that the electric kick scooter 100 is placed stably and thus secured inside accommodation module 4. The accommodation module 4 is supported on the rack frame 2, more precisely, on the horizontal frame 21 of the rack frame 2, and thus is secured. The accommodation module 4 forms a space into which the electric kick scooter is inserted. A footrest of the inserted electric kick scooter is pushed down to secure the inserted electric kick scooter. The front and rear sides of the inserted electric kick scooter are secured with a separate securing wire 432. In addition, the accommodation module 4 supplies electric power to charge the electric kick scooter in the state where the electric kick scooter is accommodated inside the accommodation module 4. To this end, the accommodation module 4 includes a stable placement frame 41, a footrest securing unit 42, an additional-securing unit 43, and the charging unit 44.

The stable placement frame 41 is configured in such a manner that a fixed space in which the electric kick scooter is accommodated is formed inside the stable placement frame 41. The front and rear sides of the stable placement frame 41 are supported on the horizontal frame 21 and thus are secured. The stable placement frame 41 supports both sides of, and the front, of the electric kick scooter. A material having elasticity is formed on the inside surface of the stable placement frame 41. Thus, friction with the electric kick scooter is reduced, and the electric kick scooter is stably secured. To this end, the stable placement frame 41 includes a bottom portion 411, a flank-surface support portion 412, the front blocking portion 413, and an elastic support portion 414.

The bottom portion 411 is configured to form the bottom of the stable placement frame 41. The front and rear sides of the bottom portion 411 are supported on the horizontal frame 21, and thus the bottom portion 411 is secured. A bottom protection member 414a is formed on the bottom portion 411, and thus the electric kick scooter is stably supported.

The flank-surface support portions 412 are configured to be formed in such a manner as to protrude upward from both sides, respectively, of the bottom portion 411 and support both the flank-surfaces of the electric kick scooter. A flank-surface protection member 414b is also formed on the inside surface of the flank-surface support portion 412, and thus the electric kick scooter is stably secured. The footrest securing unit 42 and the additional-securing unit 43 are formed on the outside surface of the flank-surface support portion 412, and thus the electric kick scooter accommodated in the stable placement frame 41 is secured.

The front blocking portion 413 is configured to block the stable placement frame 41 from moving in the forward direction, and protrudes vertically upward from the front end portion of the bottom portion 411. Therefore, the front blocking portion 413 blocks the electric kick scooter, which is inserted into the stable placement frame 41, from moving in the forward direction in order for the electric kick scooter not to move out of the stable placement frame 41. When a user pushes the electric kick scooter up to the front blocking portion 413, this is sufficient to insert the electric kick scooter. Thus, the electric kick scooter can be easily inserted. A front protection member 414c is formed on the inside surface of the front blocking portion 413, and thus the front protection member 414c is blocked from being brought into direct contact with the electric kick scooter.

The elastic support portion 414 is configured to be formed on the inside surface of the stable placement frame 41 and thus to support the electric kick scooter. It is preferable that, for stable support of the electric kick scooter, the elastic support portion 414 is formed of elastic EVA rubber or the like. In addition, the elastic support portion 414 blocks the electric kick scooter from being brought into direct contact with the stable placement frame 41, and thus the electric kick scooter and the stable placement frame 41 are prevented from being damaged due to collision between therebetween. The electric kick scooter, when inserted and withdrawn, is moved smoothly along the elastic support portion 414. Therefore, the electric kick scooter is easily inserted and withdrawn. The elastic support portion 414 includes the bottom protection member 414a, the flank-surface protection member 414b, and the front protection member 414c that are formed on the inside surfaces, respectively, of the bottom portion 411, the flank-surface support portion 412, and the front blocking portion 413.

The footrest securing unit 42 is configured to push down a footrest 101 of the electric kick scooter inserted into the stable placement frame 41 and thus to secure the footrest 101. A footrest pushing-down member 421 is combined with the upper surface of the stable placement frame 41, and thus the footrest 101 is pushed down. The footrest pushing-down member 421 is combined with the upper surface of the flank-surface support portion 412 of the stable placement frame 41, and thus the footrest 101 is pushed down. The footrest pushing-down member 421 is removably combined with a pushing-down member coupling assembly 422 that is formed on the upper surface of the flank-surface support portion 412. Therefore, regarding the footrest pushing-down member 421, only in a case where the electric kick scooter 100 is accommodated in the stable placement frame 41, the footrest pushing-down member 421 is combined with the pushing-down member coupling assembly 422, and thus the footrest 101 of the electric kick scooter 100 is pushed down. When not in use, for storage, the footrest pushing-down member 421 is hooked onto a pushing-down member cradling assembly 423.

The footrest pushing-down member 421 is configured in such a manner to push down the footrest 101 of the electric kick scooter accommodated in the stable placement frame 41. The footrest pushing-down member 421 is formed to take the form of a plate with a fixed length and width. The footrest pushing-down member 421 is configured to be formed in such a manner that both the ends of the footrest pushing-down member 421 are combined with the pushing-down member coupling assembly 422. Therefore, only when in use, the footrest pushing-down member 421 is combined with the stable placement frame 41, and thus the footrest 101 is pushed down. In addition, a member that has elasticity is formed on the lower surface of the footrest pushing-down member 421, and thus the footrest 101 is pushed down in a pressed manner. To this end, the footrest pushing-down member 421 includes a grooved end portion 421a, a stationary lever 421b, and a pressing elastic member 421c.

Figure 5:
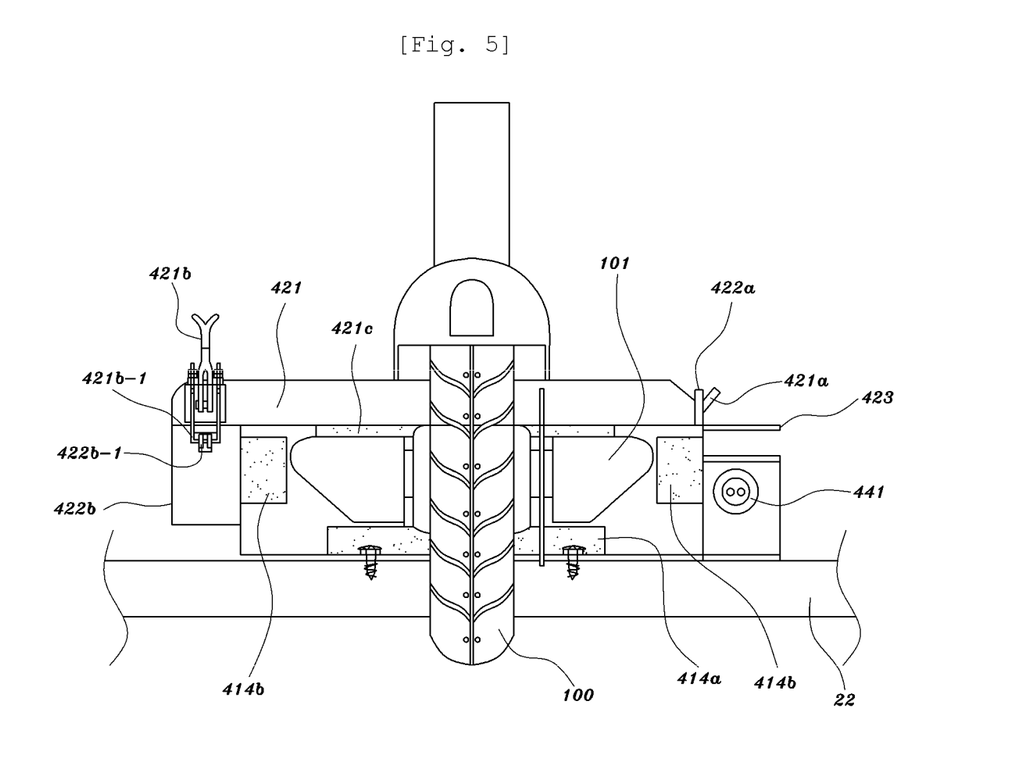
FIG. 5 is a cross-sectional diagram illustrating a state where an electric kick scooter is accommodated in the accommodation module.

The grooved end portion 421a is configured to be formed as a result of cutting a groove downward in one end portion of the footrest pushing-down member 421. As illustrated in FIG. 5, the grooved end portion 421a is hooked onto a hooking member 422a of the pushing-down member coupling assembly 422, which will be described below, and thus is secured. More precisely, the grooved end portion 421*a* is inserted into a through-hole 422*a*-1 in the hooking member 422*a* and thus enters a state of being hooked onto the hooking member 422*a*. The stationary lever 421*b* formed to be opposite in direction to the grooved end portion 421*a* is hooked onto a securing ring 422*b*-1 of the pushing-down member coupling assembly 422, which will be described below, and thus is secured. Thus, the footrest pushing-down member 421 is secured in a state where the footrest 101 is pushed down by the footrest pushing-down member 421.

The stationary lever 421*b* is configured to be formed on the other side of the footrest pushing-down member 421 and thus to be coupled to the securing ring 422*b*-1 of the pushing-down member coupling assembly 422. As illustrated in FIG. 5, a stationary lever 421*b* is pulled in a state where a hook 421*b*-1 is inserted into an insertion groove 422*b*-11 in the securing ring 422*b*-1, and thus is secured. The stationary levers 421*b* in one pair are formed on both the sides, respectively, of the footrest pushing-down member 421. When the footrest pushing-down member 421 is cradled, the stationary lever 421*b* is hooked onto the pushing-down member cradling assembly 423, and thus is supported.

The pressing elastic member 421*c* is configured to be formed on the lower surface of the footrest pushing-down member 421 and thus to be pressed against the footrest 101, and is formed of elastic EVA rubber and the like. Therefore, as illustrated in FIG. 5, by securing the stationary lever 421*b*, the pressing elastic member 421*c* is pressed against the footrest 101, thereby stably securing the electric kick scooter 100.

Two parts of the pushing-down member coupling assembly 422 are configured to be formed on both the flank-surface support portions 412, respectively, and thus to be combined with the footrest pushing-down member 421. The footrest pushing-down member 421 is removably combined. To this end, the pushing-down member coupling assembly 422 includes the hooking member 422*a* formed on the flank-surface support portion 412 on one side and a protrusion end portion 422*b* formed on the flank-surface support portion 412 on the other side.

The hooking member 422*a* is configured to be formed on the flank-surface support portion 412 in a manner that protrudes upward, and is combined with the grooved end portion 421*a*. The through-hole 422*a*-1 into which the grooved end portion 421*a* is inserted is formed to pass through the hooking member 422*a*. As illustrated in FIG. 5, the grooved end portion 421*a* passes through the through-hole 422*a*-1 and thus enters a state of being hooked onto the inside surface of the hooking member 422*a*.

The protrusion end portion 422*b* is configured to be formed in such a manner to protrude outward from the flank-surface support portion 412 on the other side, and the securing ring 422*b*-1 is formed to protrude from the front and rear sides of the protrusion end portion 422*b*. The stationary ring 422*b*-1 includes the insertion groove 422*b*-11 that results from cutting a groove upward in the lower end portion thereof. The hook 421*b*-1 is inserted, upward from below, into, and thus hooked onto the insertion groove 422*b*-11. Then, the stationary lever 421*b* is pulled and thus the hook 421*b*-1 is hooked onto the upper end portion of the insertion groove 422*b*-11, thereby maintaining a state of being secured.

Figure 6:
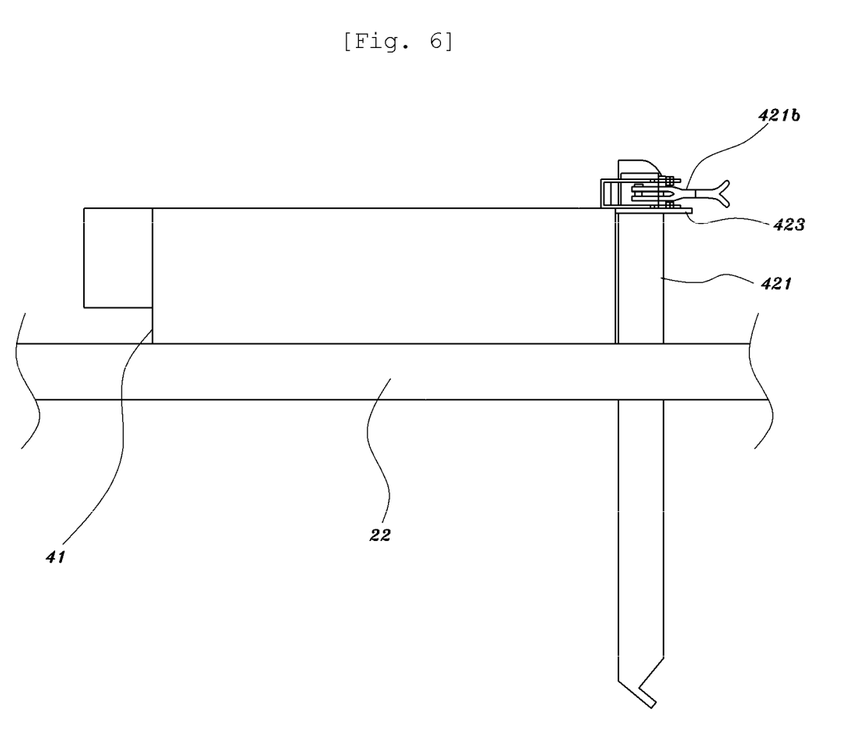
FIG. 6 is a cross-sectional diagram illustrating an example where a pushing-down member cradling assembly is used.

The pushing-down member cradling assembly 423 is configured in such a manner that, for storage, the footrest pushing-down member 421, when not in use, is hooked onto pushing-down member cradling assembly 423 between the accommodation modules 4. The pushing-down member cradling assembly 423 is formed to protrude outward from the flank-surface support portion 412 on one side and thus to take the form of a plate. An insertion hole 423*a* is formed in the pushing-down member cradling assembly 423 in such a manner as to pass vertically through the pushing-down member cradling assembly 423. As illustrated in FIG. 6, the footrest pushing-down member 421 is inserted into the insertion hole 423*a*, and thus is cradled. The stationary lever 421*b* formed on the front and rear sides of the footrest pushing-down member 421 is hooked on the upper end portion of the pushing-down member cradling assembly 423, thereby entering a state of being supported. Therefore, the footrest pushing-down member 421 is cradled in a space between the accommodation modules 4. When the electric kick scooter 100 is inserted, the footrest pushing-down member 421 positioned on one side is pulled out of the space and then secures the electric kick scooter 100. When the electric kick scooter 100 is withdrawn, the footrest pushing-down member 421 is separated from the stable placement frame 41. Then, the footrest pushing-down member 421 is inserted into the pushing-down member holding assembly 423 and thus is cradled. Therefore, due to efficient use of space as well as ease of use, many electric kick scooters are accommodated simultaneously within the vehicle 1.

Figure 7:
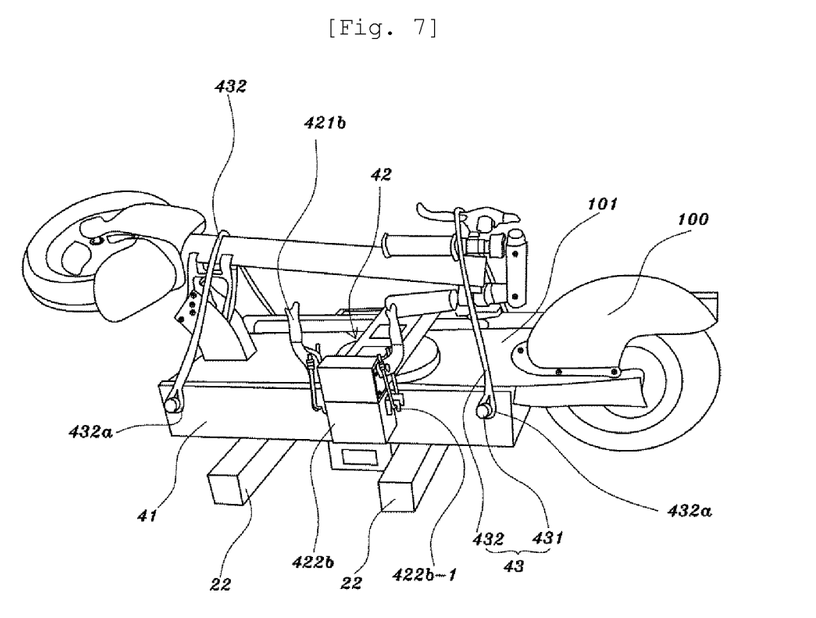
FIG. 7 is a reference diagram illustrating a state where the electric kick scooter is accommodated.

In addition to the footrest securing unit 42, the additional-securing unit 43 is configured to secure the electric kick scooter 100. With the securing wire 432 having elasticity, the electric kick scooter 100 is secured. To this end, as illustrated in FIG. 7, regarding the additional-securing unit 43, multiple protrusion members 431 are formed along an edge of the stable placement frame 41, and, for securement, the securing wire 432 is hooked onto the protrusion members 431.

The protrusion members 431 is configured to be formed in such a manner as to protrude outward from the flank-surface support portion 412 of the stable placement frame 41. Multiple protrusion members 431 are formed on each of the two flank-surface support portions 412 on one side and on the other side. Therefore, as illustrated in FIG. 7, the securing wire 432 is hooked onto the protrusion members 431 on one side and on the other side, in a state where the electric kick scooter 100 is pushed down by the securing wire 432. Thus, the electric kick scooter 100 is secured stably. In addition, the protrusion member 431 includes a hooking end portion 431*a* that protrudes outward from an end portion thereof. A hooking ring 432*a* of the securing wire 432 is hooked onto the hooking end portion 431*a* and thus is secured.

The securing wire 432 is configured to connect between the protrusion members 431 and thus to secure the electric kick scooter 100, and is formed of a wire that has both elasticity and a fixed level of strength. As described above, the securing wire 432 connects between the protrusion members 431 with the electric kick scooter 100 thereunder, and thus pushes down the electric kick scooter 100 to ensure the electric kick scooter 100 immobilized. The hooking ring 432*a* is formed on an end portion of the securing wire 432. The hooking ring 432*a* is hooked onto the hooking end portion 431*a* of the protrusion member 431 and thus is secured.

The charging unit 44 is configured to charge the electric kick scooter 100 accommodated in the stable placement frame 41. Electric power that is supplied from a separate power source is transferred to the charging unit 44. With the transferred electric power, the charging unit 44 charges the electric kick scooter 100. In addition, the charging unit 44 converts the electric power that is supplied from the separate power source, in a manner that is suitable for a voltage of the electric kick scooter 100, and supplies the converted electric power. To this end, the charging unit 44 includes the charging electrical outlet 441 that is connected to the separate power source, an electrical outlet bracket 442 that cradles an electrical outlet, an electric power conversion module 443 that converts a voltage of the electric power that is supplied from the separate power source, in a manner that is suitable for the voltage of the electric kick scooter 100, and a module bracket 444 that accommodates the electric power conversion module 443.

The charging electrical outlet 441 is configured to be connected to the separate power source and thus to be supplied with electric power and thus to transfer the supplied electric power to the electric power conversion module 443. As described above, the charging electrical outlet 441 is connected to the electric power line that passes through the empty space inside the rack frame 2. In addition, in order to be easily connected to the electric power line, the charging electrical outlet 441 is secured on the electrical outlet bracket 442 that is installed on the horizontal frame 21. The charging electrical outlet 441 is connected to the electric power line passing through the empty space inside the horizontal frame 21 in order to be supplied with electric power.

Figure 3:
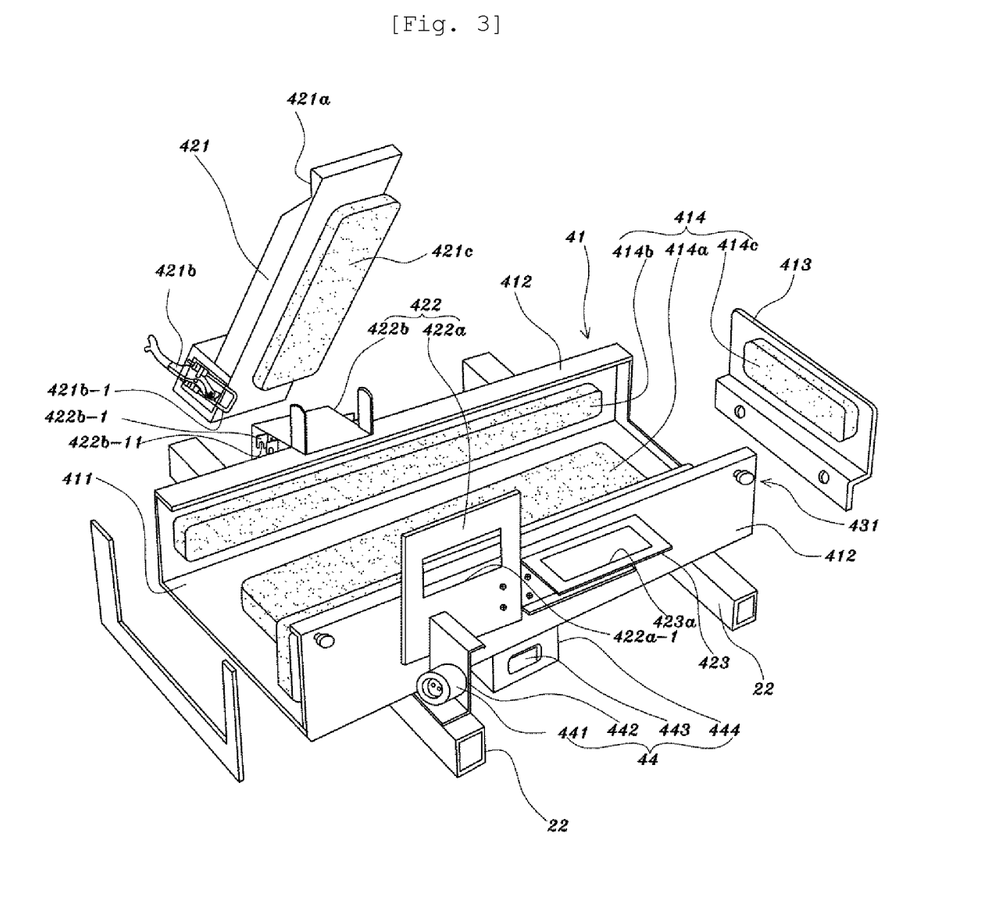
FIG. 3 is a perspective exploded diagram illustrating an accommodation module.
Figure 4:
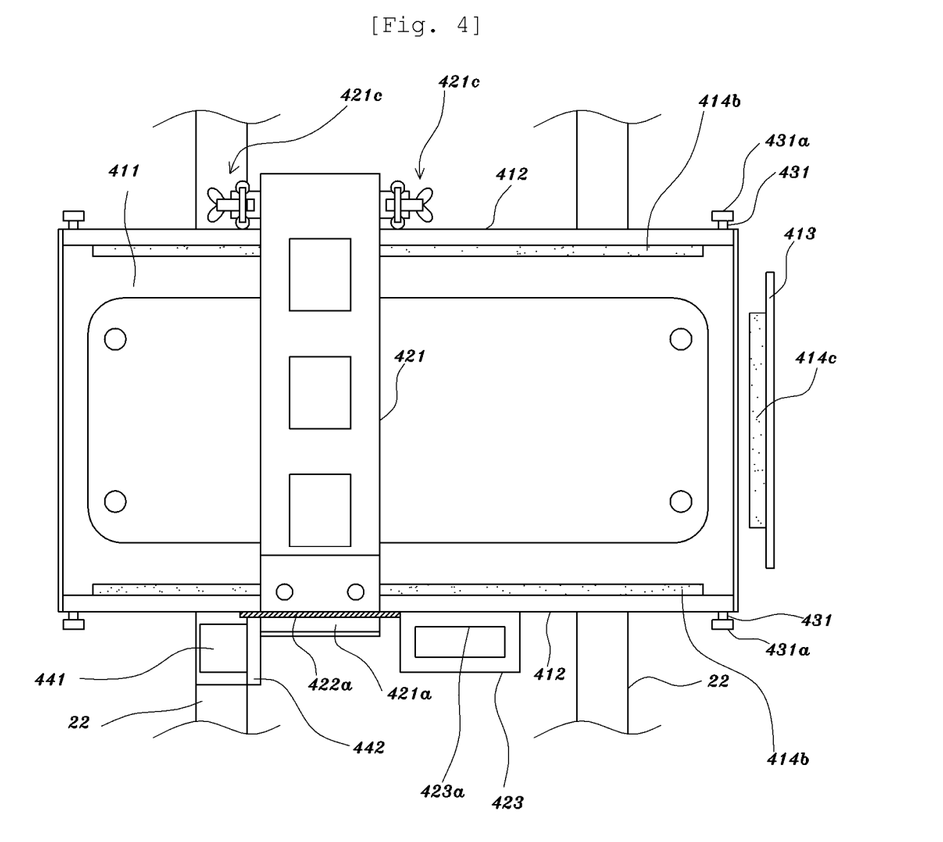
FIG. 4 is a top-view diagram illustrating the accommodation unit module.

The electrical outlet bracket 442 is configured in such a manner that the charging electrical outlet 441 is installed on electrical outlet bracket 442 in a secured manner. As illustrated in FIG. 3, the electrical outlet bracket 442 is formed to takes the shape of a bent plate that is secured to the horizontal frame 21.

The electric power conversion module 443 is configured to convert the electric power that is supplied from the separate power source, into a voltage that is suitable for the electric kick scooter 100. Various electric power conversion modules 443 find application according to a specification for the electric kick scooter 100. The electric power conversion module 443 is connected through a plug (not illustrated) that is inserted into the charging electrical outlet 441, and is accommodated in the module bracket 444 that is formed on the lower surface of the stable placement frame 41. In addition, the electric power conversion module 443 is also connected to the electric kick scooter 100 and supplies voltage-converted electric power to the electric kick scooter 100.

The module bracket 444 is configured in such a manner that a fixed space in which the electric power conversion module 443 is accommodated is formed in the module bracket 444. As illustrated in FIG. 3, the module bracket 444 is formed on the lower surface of the bottom portion 411. An open hole 444*a* is formed in one side of the module bracket 444 in such a manner that the electric power conversion module 443 is easily replaced. Thus, the electric power conversion module 443 is replaced according to the specification for the electric kick scooter 100. This makes it possible to charge the electric kick scooters 100 having various specifications.

Various embodiments of the present invention are described above, and the various embodiments are only examples in which the technical idea of the present invention is implemented. Any modification or alteration example should be interpreted as falling within the scope of the present invention, as long as the technical idea of the present invention is implemented.

The invention claimed is:

1. A movable station comprising:
   a vehicle that moves in a state where an accommodation module is accommodated inside the vehicle;
   a rack frame that is formed, within the vehicle, to have frames, and secures multiple accommodation modules; and
   the multiple accommodation modules, each of which accommodates and secures an electric kick scooter and which are formed to be mounted on the rack frame,
   where in the rack frame comprises:
   multiple vertical frames vertically installed to be secured to the floor and the ceiling within the vehicle; and
   a horizontal frame that orthogonally connects between the vertical frames such that the multiple accommodation modules are stably fixed and secured to the horizontal frame,
   wherein the accommodation module comprises:
   a stable replacement frame into which the electric kick scooter is inserted to be stably placed; and
   a footrest securing unit that pushes down a footrest of the electric kick scooter inserted into the stable replacement frame and thus secures the footrest,
   wherein the stable replacement frame comprises:
   a bottom portion that forms the bottom thereof;
   flank-surface support portions that protrude vertically upward from both sides, respectively, of the bottom portion and thus support flank surfaces, respectively, of the electric kick scooter;
   a front blocking portion that protrudes vertically upward from the front end portion of the bottom portion and thus supports the front side of the electric kick scooter; and
   a support portion made of an elastic material, which is formed on the inside surfaces of the bottom portion, the flank-surface support portion, and the front blocking portion.

2. The movable station according to claim 1, wherein the footrest securing portion comprises:
   a footrest pushing-down member that is secured on the flank-surface support portions on both sides and pushes down the footrest of the electric kick scooter; and
   a pushing-down member coupling assembly that removably secures the footrest pushing-down member to the flank-surface support portion.

3. The movable station according to claim 2, wherein:
   the stationary lever comprises a hook that is hooked on the stationary ring and thus is pulled;
   the stationary ring comprises an insertion groove that results from cutting a groove upward in the lower end portion thereof, and into which the hook is inserted; and
   by pulling the stationary lever, the hook is hooked onto the insertion groove and thus is secured.

4. The movable station according to claim 2, wherein the footrest pushing-down member comprises:
   a grooved end portion that is formed as a result of cutting a groove downward in one end portion thereof;
   stationary levers in one pair that are formed on the front and rear sides, respectively, of the other end portion thereof to be coupled to the pushing-down member coupling assembly; and
   a pressing elastic member made of an elastic material, which is formed on the lower surface of the footrest pushing-down member, and
   wherein the pushing-down member coupling assembly comprise:
   a hooking member that is formed to protrude upward from the flank-surface support portion on one side, and into which the grooved end portion is inserted through a through-hole in order to be supported; and a protrusion end portion that is formed to protrude outward from the flank-surface support portion on the other side, and from the front and rear sides of which a securing ring protrudes in order for the stationary lever to be coupled to the securing ring.

5. The movable station according to claim 4, wherein:

the footrest securing unit comprises a pushing-down member cradling assembly that cradles the footrest pushing-down member when the electric kick scooter is not accommodated;

the pushing-down member cradling assembly is formed to protrude outward from the flank-surface support portion and includes an insertion hole that passes vertically through the pushing-down member cradling assembly; and the stationary lever of the footrest pushing-down member that is inserted into the insertion hole is hooked and thus is secured.

6. The movable station according to claim 2, wherein:

the accommodation module includes an additional-securing portion that, with a securing wire, additionally secures the electric kick scooter accommodated in the stable placement frame; and the additional-securing portion includes a protrusion member that is formed to protrude outward from the flank-surface support portions on one side and on the other side, is hooked onto the securing wire, and thus is secured.

7. The movable station according to claim 6, wherein:

the securing wire is formed of an elastic material;

a hooking ring in the form of a circle is formed on an end portion thereof;

the protrusion member includes a hooking end portion that protrudes outward along an edge of an end portion thereof; and the securing ring is hooked onto the protrusion member and thus is secured.

8. The movable station according to claim 1, wherein the accommodation module includes a charging unit that charges the electric kick scooter mounted in the accommodation module.

9. The movable station according to claim 8, wherein the charging unit comprises:

a charging electrical outlet to which electric power that is supplied to the charging unit by inserting a plug is transferred;

an electric power conversion module that is connected to an electrical outlet bracket that is secured on the rack frame and thus supports the charging electrical outlet and to the charging electrical outlet, is supplied with the electrical power, converts the supplied electric power into a voltage that is suitable for the electric kick scooter, and supplies the resulting voltage to the electric kick scooter; and a module bracket that is formed to have a fixed space and accommodates the electric power conversion module in the fixed space.

10. The movable station according to claim 9, wherein the rack frame is formed to take the form of a pipe rectangle in cross section, which has an empty space inside, and an electric power line over which electric power is supplied to the charging unit passes through the empty space inside the rack frame.

* * * * *